(12) United States Patent
Nicora et al.

(10) Patent No.: US 11,690,321 B2
(45) Date of Patent: Jul. 4, 2023

(54) SYSTEM FOR SUPPLYING ELECTRIC POWER TO AGRICULTURAL HARVESTER COMPONENTS AND RELATED METHODS

(71) Applicant: CNH Industrial America LLC, New Holland, PA (US)

(72) Inventors: Fabio Nicora, Levanto (IT); Giorgio Mantovani, Genoa (IT); Alessandro Bernardini, Genoa (IT); Carlos Eduardo de Carvalho Visconti, Sao Paulo (BR)

(73) Assignee: CNH Industrial America LLC, New Holland, PA (US)

( * ) Notice: Subject to any disclaimer, the term of this patent is extended or adjusted under 35 U.S.C. 154(b) by 1267 days.

(21) Appl. No.: 16/174,858

(22) Filed: Oct. 30, 2018

(65) Prior Publication Data
US 2020/0128749 A1    Apr. 30, 2020

(51) Int. Cl.
*A01D 69/02*     (2006.01)
*A01D 45/10*     (2006.01)
(Continued)

(52) U.S. Cl.
CPC ......... *A01D 69/025* (2013.01); *A01D 34/006* (2013.01); *A01D 34/78* (2013.01); *A01D 45/10* (2013.01)

(58) Field of Classification Search
CPC .... A01D 69/02; A01D 69/025; A01D 34/006; A01D 45/10; A01D 34/78; H02J 1/00; H02J 1/082; H02J 2310/40
See application file for complete search history.

(56) References Cited

U.S. PATENT DOCUMENTS

| | | | | |
|---|---|---|---|---|
| 4,624,179 A | * | 11/1986 | Yves | G05B 19/425 100/4 |
| 7,594,377 B1 | * | 9/2009 | Jansen | A01D 34/006 56/10.2 H |

(Continued)

FOREIGN PATENT DOCUMENTS

| | | | | |
|---|---|---|---|---|
| CN | 108093871 A | * | 6/2018 | ........... A01D 69/025 |
| EP | 1563724 A1 | | 8/2005 | |

(Continued)

OTHER PUBLICATIONS

International Search Report and Written Opinion for PCT application PCT/US2019/058841, dated Feb. 14, 2020 (29 pages).

*Primary Examiner* — Alicia Torres
(74) *Attorney, Agent, or Firm* — Peter Zacharias

(57) ABSTRACT

A system for supplying electric power to components of an agricultural harvester may include a power storage device and a first agricultural harvester component. The system may also include a first bus electrically coupled to the power storage device and configured to supply electric power at a first voltage to the first agricultural harvester component. Furthermore, the system may include a second agricultural harvester component and a second bus configured to supply the electric power at a second voltage to second agricultural harvester component, the second voltage being less than the first voltage. Additionally, the system may include a converter electrically coupled between the first and the second bus, with the converter configured to reduce the first voltage supplied through the first bus to allow electric power to be supplied to the second agricultural harvester component at the second voltage via the second bus.

15 Claims, 4 Drawing Sheets

(51) Int. Cl.
    *A01D 34/00*     (2006.01)
    *A01D 34/78*     (2006.01)

(56)     References Cited

U.S. PATENT DOCUMENTS

| | | |
|---|---|---|
| 8,087,900 B2 | 1/2012 | Mackin et al. |
| 9,402,344 B1 | 8/2016 | Wenzel et al. |
| 2009/0266042 A1* | 10/2009 | Mooney .................. B60L 50/52 |
| | | 56/14.7 |
| 2013/0054070 A1* | 2/2013 | Nakagawa .......... B60L 15/2009 |
| | | 701/22 |
| 2016/0205869 A1* | 7/2016 | Wenzel ................ A01D 41/127 |
| 2017/0086374 A1* | 3/2017 | Engel ..................... A01D 47/00 |

FOREIGN PATENT DOCUMENTS

| | | | |
|---|---|---|---|
| EP | 1790205 A2 * | 5/2007 | ............. A01D 34/44 |
| EP | 2100494 A2 | 9/2009 | |
| EP | 2250873 A1 | 11/2010 | |
| EP | 3150051 A1 | 4/2017 | |
| JP | 2010/252742 | 11/2010 | |
| WO | 2014/156610 A1 | 10/2014 | |
| WO | WO 2015/056536 | 4/2015 | |

\* cited by examiner

SYSTEM FOR SUPPLYING ELECTRIC POWER TO AGRICULTURAL HARVESTER COMPONENTS AND RELATED METHODS

FIELD OF THE INVENTION

The present disclosure generally relates to agricultural harvesters, such as sugar cane harvesters, and, more particularly, to systems for supplying electric power at differing voltages to components of an agricultural harvester and related methods for operating the harvester using such components.

BACKGROUND OF THE INVENTION

Typically, agricultural harvesters include various components for cutting, processing, cleaning, and discharging crops as the crops are harvested from a field. For example, a sugar cane harvester often includes a topper assembly, which removes the leafy tops of the sugar cane plants, one or more crop dividers, which gather the sugar cane stalks for harvesting, a base cutter, which severs the sugar cane stalks from the remainder of the sugar cane plants, and a chopper assembly, which cuts the harvested sugar cane stalks into evenly-sized billets. In a conventional sugar cane harvester, the topper assembly, the crop divider(s), the base cutter, the chopper assembly, and/or other components are generally hydraulically-powered. As such, an internal combustion engine of the sugar cane harvester drives one or more hydraulic pumps, which, in turn, provide pressurized hydraulic fluid to one or more hydraulic motors for powering such components. However, the use of hydraulic power is inefficient and increases the overall cost and complexity of the sugar cane harvester.

Accordingly, an improved system for supplying power to agricultural harvester components would be welcomed in the technology. In particular, a system for supplying electric power to agricultural harvester components would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for supplying electric power to components of an agricultural harvester. The system may include a power storage device and a first agricultural harvester component. The system may also include a first bus electrically coupled to the power storage device and configured to supply electric power at a first voltage to the first agricultural harvester component. Furthermore, the system may include a second agricultural harvester component and a second bus configured to supply the electric power at a second voltage to second agricultural harvester component, the second voltage being less than the first voltage. Additionally, the system may include a converter electrically coupled between the first and the second bus, with the converter configured to reduce the first voltage supplied through the first bus to allow electric power to be supplied to the second agricultural harvester component at the second voltage via the second bus.

In another aspect, the present subject matter is directed to an agricultural harvester. The agricultural harvester may include an internal combustion engine and a generator configured to be driven by the internal combustion engine so as to generate electric power. The agricultural harvester may also include a power storage device configured to store the generated electric power. Furthermore, the agricultural harvester may include a first component and a first power supply system having a first bus electrically coupled to the power storage device and configured to supply the electric power at a first voltage to the first component. Additionally, the agricultural harvester may include a second component and a second power supply system having a second bus configured to supply electric power at a second voltage to the second component, with the second voltage being less than the first voltage. The second power supply system may also include a converter configured to reduce the first voltage supplied through the first bus to allow electric power to be supplied to the second agricultural harvester component at the second voltage via the second bus.

In a further aspect, the present subject matter is directed to a method for controlling the operation of an agricultural harvester. The agricultural harvester may include a first bus configured to supply electric power at a first voltage to a first agricultural harvester component. The agricultural harvester may also include a second bus configured to supply the electric power at a second voltage to a second agricultural harvester component, with the second voltage being less than the first voltage. The method may include monitoring, with a computing device, an operational parameter of the agricultural harvester as the agricultural harvester is moved across a field. The method may also include controlling, with the computing device, a flow of the electric power at the first voltage to the first agricultural harvester component based on the determined operational parameter. Furthermore, the method may include controlling, with the computing device, an operation of a converter in a manner that converts the electric power received from the first bus at the first voltage to the second voltage for supply to the second bus. Additionally, the system may include controlling, with the computing device, a flow of the electric power at the second voltage to the second agricultural harvester component based on the determined operational parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
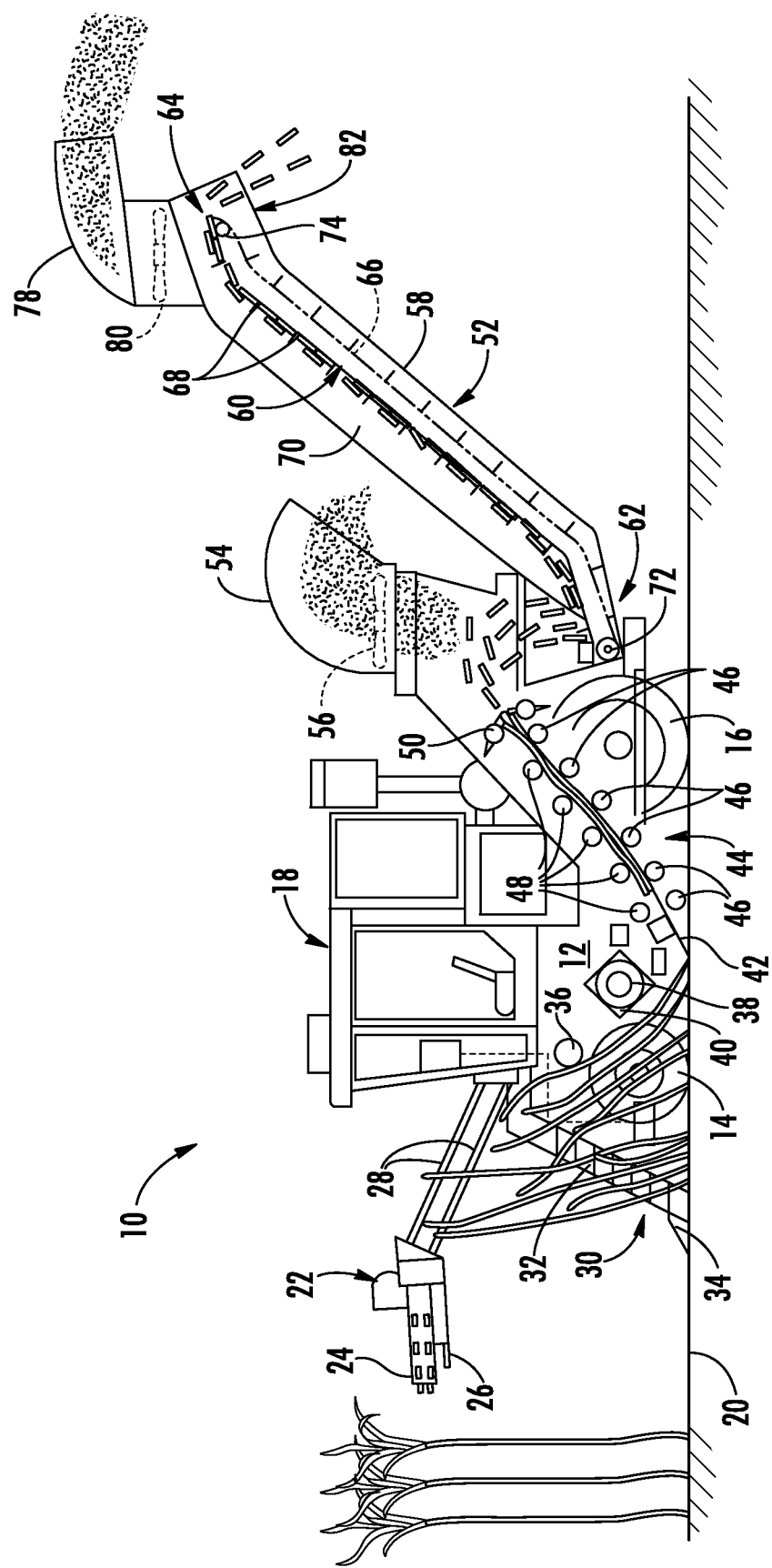
FIG. 1 illustrates a simplified, side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems for supplying electric power to components of an agricultural harvester and related methods. Specifically, in several embodiments, the system may include one or more power storage devices (e.g., one or more batteries) configured to store electric power produced by a generator driven by an internal combustion engine of the harvester. The system may also include a first or high voltage bus electrically coupled to the power storage device(s) and configured to supply electric power at a first or high voltage (e.g., 400-600 V) to one or more high voltage components. For example, in one embodiment, the high voltage bus may be configured to supply the high voltage power to a base cutter, a chopper assembly, a primary extractor, a fan, and/or an elevator of the harvester and, more specifically, to one or more electric motors driving such component(s). Furthermore, the system may also include a second or low voltage bus configured to supply electric power at a second or low voltage (e.g., 48 V) to one or more low voltage components. For example, in one embodiment, the low voltage bus may be configured to supply low voltage power to one or more crop dividers, a topper assembly, one or more gatherer drums, and/or a secondary extractor of the harvester and, more specifically, to one or more electric motors driving such component(s). Additionally, the system may include a converter (e.g., a buck converter) electrically coupled between the high and low voltage buses. In this regard, the converter may be configured to reduce the high voltage supplied through the high voltage bus in a manner that permits electric power to be supplied to the low voltage component(s) at the low voltage via the low voltage bus. As such, the disclosed system allows a single power source to supply electric power to the both high and low voltage components of the harvester at the appropriate voltages, thereby maximizing the efficiency of the harvester.

Referring now to the drawings, FIG. 1 illustrates a side view of one embodiment of an agricultural harvester 10 in accordance with aspects of the present subject matter. As shown, the harvester 10 is configured as a sugar cane harvester. In this regard, the harvester 10 may generally include a frame 12, a pair of front wheels 14, a pair of rear wheels 16, and an operator's cab 18. As will be described below, one or both pairs of the wheels 14, 16 may be driven or otherwise powered by a powertrain 100 (FIG. 2) of the harvester 10. However, in other embodiments, the harvester 10 may correspond to any other suitable agricultural harvester known in the art and/or have any other suitable configuration. For example, in one alternative embodiment, the harvester 10 may be a track-driven and, thus, may include tracks driven by the powertrain 100.

As shown in FIG. 1, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in a forward direction of travel. As shown, the topper assembly 22 may include both a gathering disk 24 and a cutting disk 26. The gathering disk 24 may be configured to gather the sugar cane stalks, thereby permitting the cutting disk 26 to cut off the leafy top of each stalk. As is generally understood, the height of the topper assembly 22 may be adjusted via a pair of arms 28, which may be raised and lowered, as desired, by the operator of the harvester 10.

Furthermore, the harvester 10 may include one or more crop dividers 30 (one is shown in FIG. 1) that extend upwardly and rearwardly from the field 20. In general, each crop divider 30 may include a spiral feed roller or gatherer drum 32. Each gathering drum 32 may, in turn, include a ground shoe 34 at its lower end to assist the gatherer drum 32 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are toppled as the crop divider(s) 30 gathers the stalks from the field 20. Further, as shown in FIG. 1, the fin roller 38 may include a plurality of intermittently mounted fins 40 that assist in forcing the sugar cane stalks downwardly. As the fin roller 38 is rotated during harvesting, the sugar cane stalks that have been toppled by the knock-down roller 36 are separated and further knocked down by the fin roller 38 as the harvester 10 moves in the forward direction of travel.

Referring still to FIG. 1, the harvester 10 may also include a base cutter assembly 42 positioned behind the fin roller 30. As is generally understood, the base cutter assembly 42 may include one or more blades (not shown) for severing the sugar cane stalks as the cane is being harvested. The blade(s) may be located on the periphery of the base cutter assembly 42 and angled downwardly to sever the base of the sugar cane as the cane is toppled by the fin roller 30.

Moreover, the harvester 10 may include a feed roller assembly 44 located downstream of the base cutter assembly 42 for moving the severed stalks of sugar cane from base cutter assembly 42 along a processing path of the harvester 10. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" that may be, for example, six inches long. The billets may then be propelled towards an elevator assembly 52 of the harvester 10 for delivery to an external receiver or storage device (not shown), such as a sugar cane billet cart.

As is generally understood, pieces of debris (e.g., dust, dirt, leaves, etc.) separated from the sugar cane billets may be expelled from the harvester 10 through a primary extractor 54. More specifically, the primary extractor 54 may be located behind the chopper assembly 50 and oriented to direct the debris outwardly from the harvester 10. Additionally, an extractor fan 56 may be mounted at the base of the primary extractor 54 for generating a suction force or vacuum sufficient to pick up the debris and force the debris through the primary extractor 54. The separated or cleaned billets are heavier than the debris being expelled through the extractor 54 and, accordingly, may fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced apart along the chain 66. As such, the paddles 68 may be configured to hold the sugar cane billets on the elevator 60 as the billets are elevated along a top span 70 of the elevator 60 defined between its proximal and distal ends 62, 64. Additionally, the elevator 60 may include lower and upper sprockets 72, 74 positioned at its proximal and distal ends 62, 64, respectively. As will be described below, one of the sprockets (e.g., the upper sprocket 74) may be rotationally driven such that the chain 66 and the paddles 68 travel in an endless loop between the proximal and distal ends 62, 64 of the elevator 60.

Moreover, pieces of debris (e.g., dust, dirt, leaves, etc.) separated from the elevated sugar cane billets may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris outwardly from the harvester 10. Additionally, an extractor fan 80 may be mounted at the base of the secondary extractor 78 for generating a suction force or vacuum sufficient to pick up the debris and force the debris through the secondary extractor 78. The separated, cleaned billets, heavier than the debris expelled through the extractor 78, may then fall from the distal end 64 of the elevator 60. Typically, the billets may then be ejected from the harvester 10 through a discharge opening 82 of the elevator assembly 52 into the external receiver or storage device (not shown).

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider(s) 30, the ground shoes 34 may set the operating width to determine the quantity of sugar cane entering the throat of the harvester 10. The gatherer drums 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets (e.g., 6 inch cane sections). Airborne debris or chaff (e.g., dust, dirt, leaves, etc.) separated from the sugar cane billets is then extracted through the primary extractor 54 using suction created by the extractor fan 56. The separated/cleaned billets then fall downwardly into the elevator assembly 52 and travel upwardly via the elevator 60 from its proximal end 62 to its distal end 64. Once the billets reach the distal end 64 of the elevator 60, the billets are carried to the discharge opening 82 for ejection from the harvester 10 to the external receiver or storage device. Similar to the primary extractor 54, chaff is blown out from harvester 10 through the secondary extractor 78 with the aid of the extractor fan 80.

Figure 2:
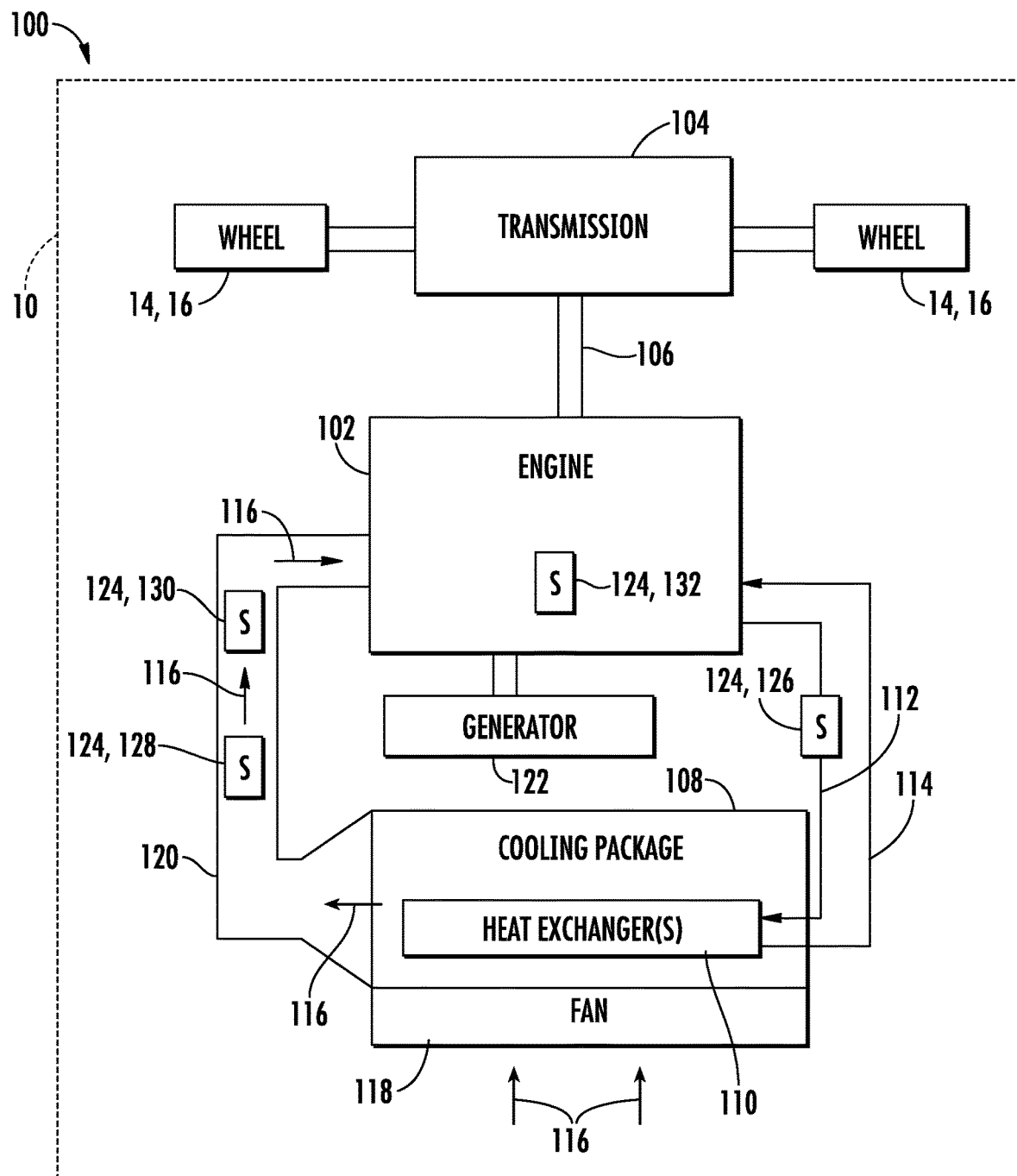
FIG. 2 illustrates a schematic view of one embodiment of a powertrain of an agricultural harvester in accordance with aspects of the present subject matter.

Referring now to FIG. 2, a schematic view of one embodiment of a powertrain 100 of the harvester 10 is illustrated in accordance with aspects of the present subject matter. As indicated above, the powertrain 100 may be configured to drive or otherwise power one or both pairs of the wheels 14, 16. In this regard, the powertrain 100 may include an internal combustion engine (ICE) 102 and a transmission 104 mounted on the frame 12 of the harvester 10. The engine 102 may be configured to generate power by combusting or otherwise burning a mixture of air and fuel (e.g., diesel fuel). The transmission 104 may, in turn, be configured to transmit the power generated by the ICE 102 to one or both pairs of the wheels 14, 16 of the harvester 10. For example, in one embodiment, the transmission 104 may be configured as a suitable hydrostatic transmission having a pump (not shown) coupled to the ICE 102 and one or more hydraulic motors (not shown) coupled to one or more of the wheels 14, 16. In such embodiment, the ICE 102 may be configured to rotationally drive a driveshaft 106, which, in turn, rotationally drives the pump in a manner that generates pressurized fluid (e.g., hydraulic oil). The pressurized fluid may, in turn, rotationally drive the hydraulic motor(s), thereby powering the wheels 14, 16. However, in alternative embodiments, the transmission 104 may be configured as any other suitable type of transmission.

In several embodiments, the powertrain 100 may include a cooling package 108 configured to house one or more heat exchangers 110 associated with the ICE 102. In general, the heat exchanger(s) 110 may be configured to cool or otherwise reduce the temperature of one or more fluids (e.g., coolant, oil, transmission fluid, air, etc.) that support the operation of the ICE 102. For example, in one embodiment, a supply line (e.g., as indicated by arrow 112) may provide fluid from the ICE 102 to the heat exchanger(s) 110 for cooling thereof. Similarly, a return line (e.g., as indicated by arrow 114) may convey the fluid from the heat exchanger(s) 110 back to the ICE 102. It should be appreciated that the heat exchanger(s) 110 may, for example, correspond to one or more radiators, oil coolers, transmission coolers, intercoolers, and/or the like.

As shown in FIG. 2, air (e.g., as indicated by arrows 116) may flow through the cooling package 108 to cool the fluids circulating through the heat exchanger(s) 110. More specifically, a fan 118 may draw the air 116 into the cooling package 108. As the air 116 flows over the heat exchanger(s) 110, the air 116 may absorb heat from the fluids therein. A portion of the air 116 may then exit the cooling package and flow over the ICE 102, thereby cooling the ICE 102. Another portion of the air 116 may exit the cooling package 108 and flow through an air conduit 120 and/or one or more air filters (not shown) before being supplied to the ICE 102 for combustion.

Furthermore, as shown in FIG. 2, the harvester 10 may include a generator 122. Specifically, in several embodiments, the generator 122 may be driven by the ICE 102 in a manner that generates electric power. For example, in one embodiment, the generator 122 may be driven by a suitable belt (e.g., a V-belt) coupled to an accessory drive of the ICE 102. However, it should be appreciated that, in alternative embodiments, the generator 122 may be coupled to the ICE 102 in any other suitable manner. Furthermore, it should be appreciated that the generator 122 may be configured to generate either alternating current (AC) electric power (sometimes referred to as an alternator) or direct current (DC) electric power.

Additionally, in several embodiments, the harvester 10 may include one or more sensors 124 configured to monitor one or more operational parameters of the harvester 10, such as one or more parameters of the powertrain 100. In general, the operational parameter(s) may correspond to any suitable parameter(s) of the harvester 10 that provides an indication of or otherwise are correlated to the operation and/or performance of the powertrain 100 and/or other systems of the harvester 10. As such, the sensor(s) 124 may generally correspond to any suitable sensor or sensing device that is configured to monitor a given operational parameter(s). For instance, the sensor(s) 124 may correspond to one or more temperature sensors 126 for monitoring the temperature of the fluid(s) that support the operation of the ICE 102. The sensor(s) 124 may also include one or more mass airflow sensors 128 for monitoring the mass or amount of the air 116 flowing through the air conduit 120 or otherwise entering the ICE 102 for combustion. Moreover, the sensor(s) 124 may correspond to one or more temperature sensors 130 for monitoring the temperature of the air 116 flowing through the air conduit 120 or otherwise entering the ICE 102. Furthermore, the sensor(s) 124 may correspond to one or more rotational speed sensors 132 for monitoring the rotational speed of the ICE 102 (e.g., the rotational speed of a crankshaft of the ICE 102).

Additionally, as shown in FIG. 2, the sensor(s) 124 may be provided in operative association with any number of harvester components and/or installed at any suitable location(s) within and/or relative to the harvester 10. For instance, as shown in the illustrated embodiment, the temperature sensor(s) 126 may be provided in operative association with the supply line 112, the mass airflow sensor(s) 128 and the temperature sensor(s) 130 may be provided in operative association with the air conduit 120, and the rotational speed sensor(s) 132 may be provided in operative association with the ICE 102. Alternatively, the sensor(s) 124 may be provided in operative association with any other suitable components and/or installed at any other suitable location that allows for an operational parameter(s) of the harvester 10 to be monitored.

It should be appreciated that the configuration of the harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
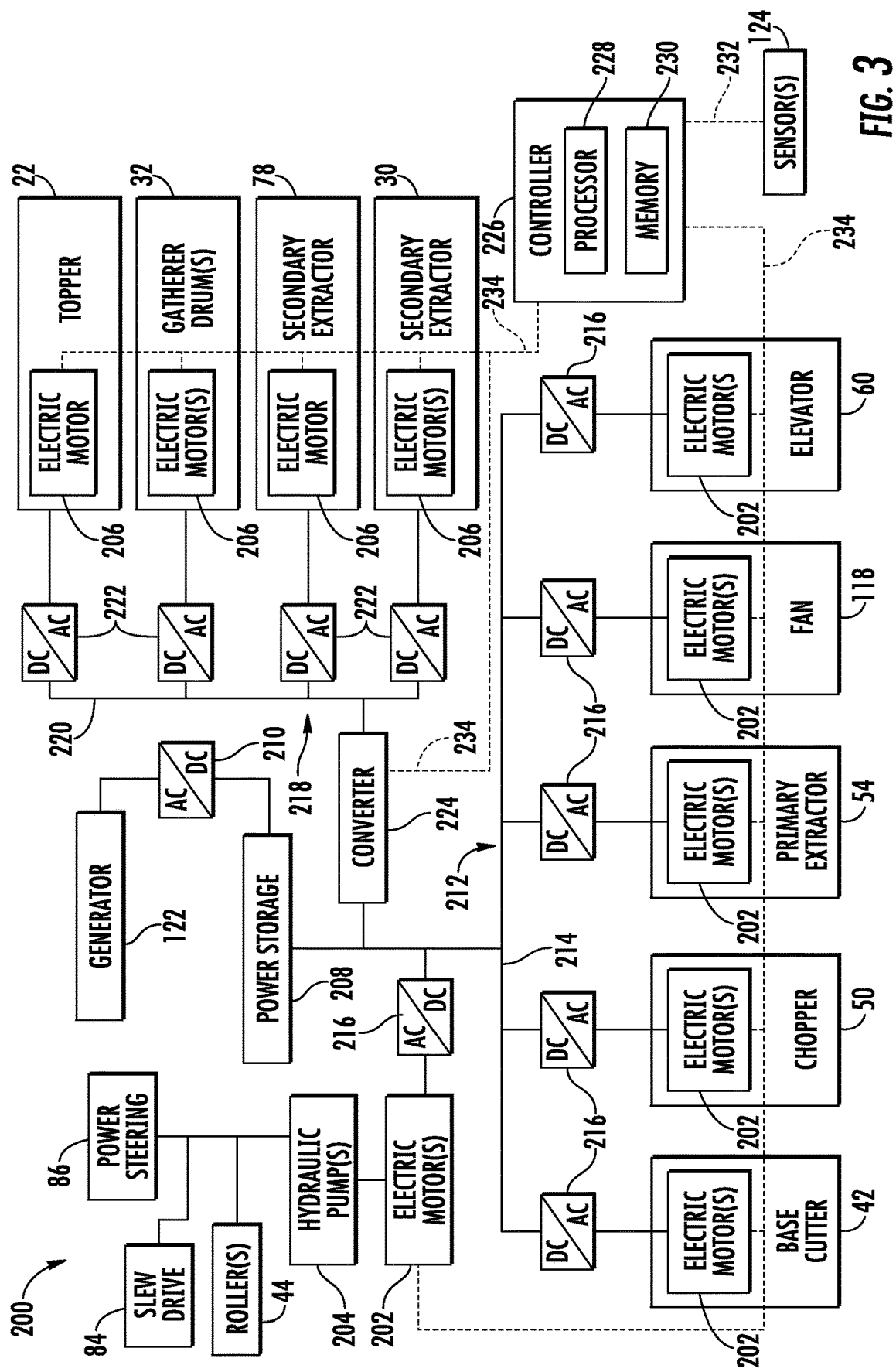
FIG. 3 illustrates a schematic view of one embodiment of a system for system for supplying electric power to components of an agricultural harvester in accordance with aspects of the present subject matter.

Referring now to FIG. 3, a schematic view of one embodiment of a system 200 for supplying electric power to components of an agricultural harvester is illustrated in accordance with aspects of the present subject matter. In general, the system 100 will be described herein with reference to the harvester 10 described above with reference to FIGS. 1 and 2. However, it should be appreciated by those of ordinary skill in the art that the disclosed system 200 may generally be utilized with harvesters having any other suitable harvester configuration.

As shown in FIG. 3, the system 200 may include one or more high voltage components of the harvester 10 and one or more low voltage components of the harvester 10. As will be described below, the high voltage component(s) may be operated by electric power having a first or high voltage, while the low voltage component(s) may be operated by electric power having a second or low voltage. For example, as shown in FIG. 3, in one embodiment, the high voltage component(s) of the harvester 10 may include the base cutter 42, the chopper assembly 50, the primary extractor 54, the elevator 60, and the fan 118. Moreover, in the illustrated embodiment, the low voltage components of the harvester 10 may include the topper assembly 22, the gatherer drum(s) 32, the secondary extractor 78, and the crop divider(s) 30. However, it should be appreciated that, in alternative embodiments, the high voltage component(s) of the system 200 may include any other components of the harvester 10 that are operated by electric power at the high voltage. Similarly, the low voltage component(s) of the system 200 may include any other components of the harvester 10 that are operated by electric power at the low voltage.

Furthermore, as shown in FIG. 3, each of the high voltage components may include one or more high voltage electric motors 202. For example, the electric motor(s) 202 of the base cutter 42 to may be configured to rotationally drive the blades (not shown) thereof in a manner that severs the sugar cane stalks. The electric motor(s) 202 of the chopper assembly 50 may configured to rotationally drive blades (not shown) thereof in a manner that cuts or chops the severed sugar cane stalks into billets. Moreover, the electric motor(s) 202 of the primary extractor 54 may be configured to rotationally drive the associated extractor fan 56. Additionally, the electric motor(s) 202 of the elevator 60 may be configured to rotationally drive one of the sprockets (e.g., the upper sprocket 74) of the elevator 60 such that the chain 66 and the paddles 68 travel in an endless loop. Further, electric motor(s) 202 of the fan 118 may be configured rotationally drive the blades (not shown) thereof. In one embodiment, each high voltage electric motor 202 may be configured as a suitable three-phase AC motor. However, it should be appreciated that the high voltage electric motor(s) 202 may correspond to any other suitable AC or DC electric motor(s).

In one embodiment, the system 200 may include one or more additional high voltage electric motors 202 configured to power one or more hydraulic pumps 204 of the harvester 10. More specifically, the additional electric motor(s) 202 may be configured to rotationally drive the hydraulic pump(s) 204 in a manner that generates pressurized hydraulic fluid. The pressurized hydraulic fluid may, in turn, be supplied to one or more hydraulically-driven components of the harvester 10. For example, in the illustrated embodiment, the hydraulic pump(s) 204 may be configured to supply pressurized hydraulic fluid to the feed roller assembly 44, such as to one or more hydraulic pumps (not shown) configured to drive the associated rollers 46, 48. Furthermore, the hydraulic pump(s) 204 may be configured to supply pressurized hydraulic fluid to a slew drive 84 of the harvester 10. As is generally understood, the slew drive 84 may be configured to rotate or otherwise adjust the orientation of the elevator assembly 52 relative to the frame 12 of the harvester 10. Additionally, the hydraulic pump(s) 204 may be configured to supply pressurized hydraulic fluid to a power steering system 86 of the harvester 10. However, in alternative embodiments, the hydraulic pump(s) 204 may be configured to supply pressurized hydraulic fluid to any other suitable component(s) of the harvester 10.

Additionally, as shown in FIG. 3, each of the low voltage components may include one or more low voltage electric motors 206. For instance, the electric motor(s) 206 of the topper assembly 22 may be configured to rotationally drive gathering disk 24 and/or the cutting disk 26 and/or adjust the height of the topper assembly 22. The electric motor(s) 206 of the crop divider(s) 30 may be configured to adjust the position of the crop divider(s) 30 relative to the frame 12 of the harvester 10. Moreover, the electric motor(s) 206 of the gatherer drum(s) 32 may be configured to rotationally drive the gatherer drum(s) 32. Furthermore, the electric motor(s) 206 of the secondary extractor 78 may be configured to rotationally drive the associated extractor fan 80. In one embodiment, each low electric motor 206 may be configured as a suitable three-phase AC motor. However, it should be appreciated that the low voltage electric motor(s) 206 may correspond to any suitable AC or DC electric motor(s).

In several embodiments, the system 200 may include one or more power storage devices 208. Specifically, in several embodiments, the power storage device(s) 208 may be electrically coupled to the generator 122 in a manner that permits the power storage device(s) 208 to receive and store electric power generated by the generator 122. For example, in one embodiment, each power storage device 208 may correspond to a suitable battery, such as a sodium nickel chloride battery, a sodium sulfur battery, a lithium ion battery, a nickel metal hydride battery, and/or the like, or a battery bank. However, in alternative embodiments, the power storage device(s) 208 correspond to any other suitable device(s) storing electric power, such as an ultra-capacitor(s). Additionally, in embodiments in which the generator 122 generates AC electric power, the system 200 may include an AC-to-DC converter 210 electrically coupled between the generator 122 and the power storage device(s) 208. As such, the AC-to-DC converter 210 may be configured to convert the AC electric power generated by the generator 122 to DC electric power suitable for storage in the power storage device(s) 208.

Moreover, the system 200 may include a first or high voltage power supply system 212 configured to supply electric power to the high voltage components of the harvester 10. Specifically, in several embodiments, the high voltage power supply system 212 may include a first or high voltage bus 214 electrically coupled between the power storage device(s) 208 and the high voltage electric motor(s) 202 of the high voltage component(s). In this regard, the high voltage bus 214 may receive electric power, such as DC power, discharged from the power storage device(s) 208 at the high voltage. The high voltage bus 214 may, in turn, transmit or otherwise supply the received electric power at the high voltage to the high voltage electric motor(s) 202. In embodiments in which the electric motor(s) 202 are AC motors, the system 200 may include one or more DC-to-AC converters 216 electrically coupled between the high voltage bus 214 and the electric motor(s) 202. As such, the DC-to-AC converter(s) 216 may be configured to convert the DC electric power received from the high voltage bus 214 to AC electric power suitable for consumption by the electric motor(s) 202. Additionally, in one embodiment, the high voltage may be between 200 V and 800 V, such as between 300 V and 700 V and/or between 400 V and 600 V. However, in alternative embodiments, the high voltage may correspond to any other suitable voltage or range of voltages.

Furthermore, the system 200 may include a second or low voltage power supply system 218 configured to supply electric power to the low voltage components of the harvester 10. Specifically, in several embodiments, the low voltage power supply system 218 may include a second or low voltage bus 220 electrically coupled between the low voltage electric motor(s) 206 of the low voltage component(s). In this regard, the low voltage bus 220 may transmit or otherwise supply electric power at the low voltage to the low voltage electric motor(s) 206. In embodiments in which the electric motor(s) 206 are AC motors, the system 200 may include one or more DC-to-AC converters 222 electrically coupled between the low voltage bus 220 and the electric motor(s) 206. As such, the DC-to-AC converter(s) 222 may be configured to convert the DC electric power received from the low voltage bus 220 to AC electric power suitable for consumption by the electric motor(s) 206. Additionally, in one embodiment, the low voltage may be between 20 V and 80 V, such as between 30 V and 70 V, between 40 V and 60V, and/or 48 V. As such, it should be appreciated that the second or low voltage may be less than the first or high voltage, such as at least five times less than the high voltage. However, in alternative embodiments, the low voltage may correspond to any other suitable voltage or range of voltages.

In accordance with aspects of the present subject matter, the low voltage power supply system 218 may also include a converter 224. Specifically, in several embodiments, the converter 224 may be electrically coupled between the high and low voltage buses 214 and 220. In this regard, the converter 224 may be configured to receive electric power at the high voltage from the high voltage bus 214, convert the received electric power to the low voltage, and supply electric power to the low voltage bus 220 at the low voltage. That is, the converter 224 may be configured to reduce the high voltage electric power supplied through the high voltage bus 214 to allow electric power to be supplied to the low voltage electric motor(s) 206 at the low voltage via the low voltage bus 220. In this regard, the converter 224 permits a single high voltage power source, such as the power storage device(s) 208, to supply electric power to both the high voltage and low voltage components of the harvester 10. In one embodiment, the converter 224 may be configured as a DC-to-DC buck or step-down converter. However, in alternative embodiments, the converter 224 may be configured as any other suitable type of converter, such as a buck/boost converter.

Additionally, as shown in FIG. 3, the system 200 may include a controller 226 configured to electronically control the operation of one or more components of the harvester 10. In general, the controller 226 may comprise any suitable processor-based device known in the art, such as a computing device or any suitable combination of computing devices. Thus, in several embodiments, the controller 226 may include one or more processor(s) 228 and associated memory device(s) 230 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 230 of the controller 226 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 230 may generally be configured to store suitable computer-readable instructions that, when implemented by the processor(s) 228, configure the controller 226 to perform various computer-implemented functions, such as one or more aspects of the method 300 described below with reference to FIG. 4. In addition, the controller 226 may also include various other suitable components, such as a communications circuit or module, one or more input/output channels, a data/control bus and/or the like.

It should be appreciated that the controller 226 may correspond to an existing controller of the harvester 10 or the controller 226 may correspond to a separate processing device. For instance, in one embodiment, the controller 226 may form all or part of a separate plug-in module that may be installed within the harvester 10 to allow for the disclosed system and method to be implemented without requiring additional software to be uploaded onto existing control devices of the harvester 10.

In several embodiments, the controller 226 may be configured to monitor one or more operational parameters of the harvester 10. Specifically, as shown in FIG. 3, the controller 226 may be communicatively coupled to the sensor(s) 124 via wired or wireless connection to allow sensor data (e.g., as indicated by dashed lines 232 in FIG. 3) to be transmitted from the sensor(s) 124 to the controller 226. In this regard, the controller 226 may be configured to monitor the operational parameter(s) of the harvester 10, such as the operational parameter(s) of the powertrain 100, based on the received sensor data 232. For instance, the controller 226 may include a look-up table, suitable mathematical formula, and/or algorithms stored within its memory 230 that correlates the received sensor data 232 to the operational parameter(s).

Furthermore, in several embodiments, the controller 226 may be configured to control the flow of the electric power at the first voltage to the high voltage component(s) based on the monitored operational parameter(s). Specifically, as shown in FIG. 3, the controller 226 may be communicatively coupled to the high voltage electric motor(s) 202 via a wired or wireless connection to allow control signals (e.g., as indicated by dashed lines 234 in FIG. 3) to be transmitted from the controller 226 to the electric motor(s) 202. As such, the controller 226 may be configured to transmit control signals 234 to one or more components of the electric motor(s) 202 (e.g., suitable switching device(s), contactor(s), integrated controller(s), and/or the like) instructing such component(s) to adjust or otherwise control the flow of the electric power supplied to the electric motor(s) 202 from the high voltage bus 214 based on the monitored operational parameter(s). For example, in embodiments in which the electric motor(s) 202 are AC motor(s), the control signals 234 may instructing the component(s) of the electric motor(s) 202 to adjust the frequency of the electric power received from the high voltage bus 214. However, in alternative embodiments, the controller 226 may be configured to control the flow of the electric power to the high voltage component(s) in any other suitable manner. For example, the controller 226 may configured to control the operation of the associated DC-to-AC converter(s) 216 and/or one or more switching devices or contactors (not shown) coupled between the high voltage bus 214 and the associated DC-to-AC converter(s) 216 in a manner the controls the flow of electric power to the high voltage component(s).

Moreover, in several embodiments, the controller 226 may be configured to control the flow of the electric power at the second voltage to the low voltage component(s) based on the monitored operational parameter(s). Specifically, as shown in FIG. 3, the controller 226 may be communicatively coupled to the low voltage electric motor(s) 206 via a wired or wireless connection to allow control signals 234 to be transmitted from the controller 226 to the electric motor(s) 206. As such, the controller 226 may be configured to transmit control signals 234 to one or more components of the electric motor(s) 206 (e.g., suitable switching device(s), contactor(s), integrated controller(s), and/or the like) instructing such component(s) to adjust or otherwise control the flow of the electric power supplied to the electric motor(s) 206 from the low voltage bus 220 based on the monitored operational parameter(s). For example, in embodiments in which the electric motor(s) 206 are AC motor(s), the control signals 234 may instructing the component(s) of the electric motor(s) 206 to adjust the frequency of the electric power received from the low voltage bus 220. However, in alternative embodiments, the controller 226 may be configured to control the flow of the electric power to the low voltage component(s) in any other suitable manner. For example, the controller 226 may configured to control the operation of the associated DC-to-AC converter(s) 222 and/or one or more switching devices or contactors (not shown) coupled between the low voltage bus 220 and the associated DC-to-AC converter(s) 222 in a manner the controls the flow of electric power to the low voltage component(s).

In one embodiment, the controller 226 may be configured to control the flow of the electric power to the high and/or low voltage component(s) based the load exerted on the ICE 102. More specifically, the load on the ICE 102 may generally be indicative of the amount or volume of sugar cane being ingested by the harvester 10 for processing. In this regard, the controller 226 may be configured to monitor the load on the ICE 102 based on the sensor data 232 received from the sensor(s) 124, such as based on the sensor data received from the temperature sensors 126, 130, the mass airflow sensor(s) 128, and/or the rotational speed sensor(s) 132. As such, the controller 226 may include a look-up table, suitable mathematical formula, and/or algorithms stored within its memory 230 that correlates the received sensor data 232 to the load on the ICE 102. Thereafter, in the event that the load on the ICE 102 decreases, the flow of electric power to the electric motors 202, 206 may be adjusted in a manner the slows the operation of the associated high and/or low voltage components (e.g., by decreasing the frequency of the supplied electric power) to accommodate the decreased volume of sugar cane being ingested. Conversely, in the event that the load on the ICE 102 increases, the flow of electric power to the electric motors 202, 206 may be adjusted in a manner the speeds up the operation of the associated high and/or low voltage components (e.g., increasing the frequency of the supplied electric power) to accommodate the increased volume of sugar cane being ingested.

In accordance with aspects of the present subject matter, the controller 226 may be configured to control the operation of the converter 224. Specifically, as shown in FIG. 3, the controller 226 may be communicatively coupled to the converter 224 via a wired or wireless connection to allow control signals 234 to be transmitted from the controller 226 to the converter 224. As such, the controller 226 may be configured to transmit control signals 234 to the converter 224 instructing the converter 224 to operate in a manner that converts the electric power received from the high voltage bus 214 at the high voltage to the low voltage for supply to the low voltage bus 220.

Figure 4:
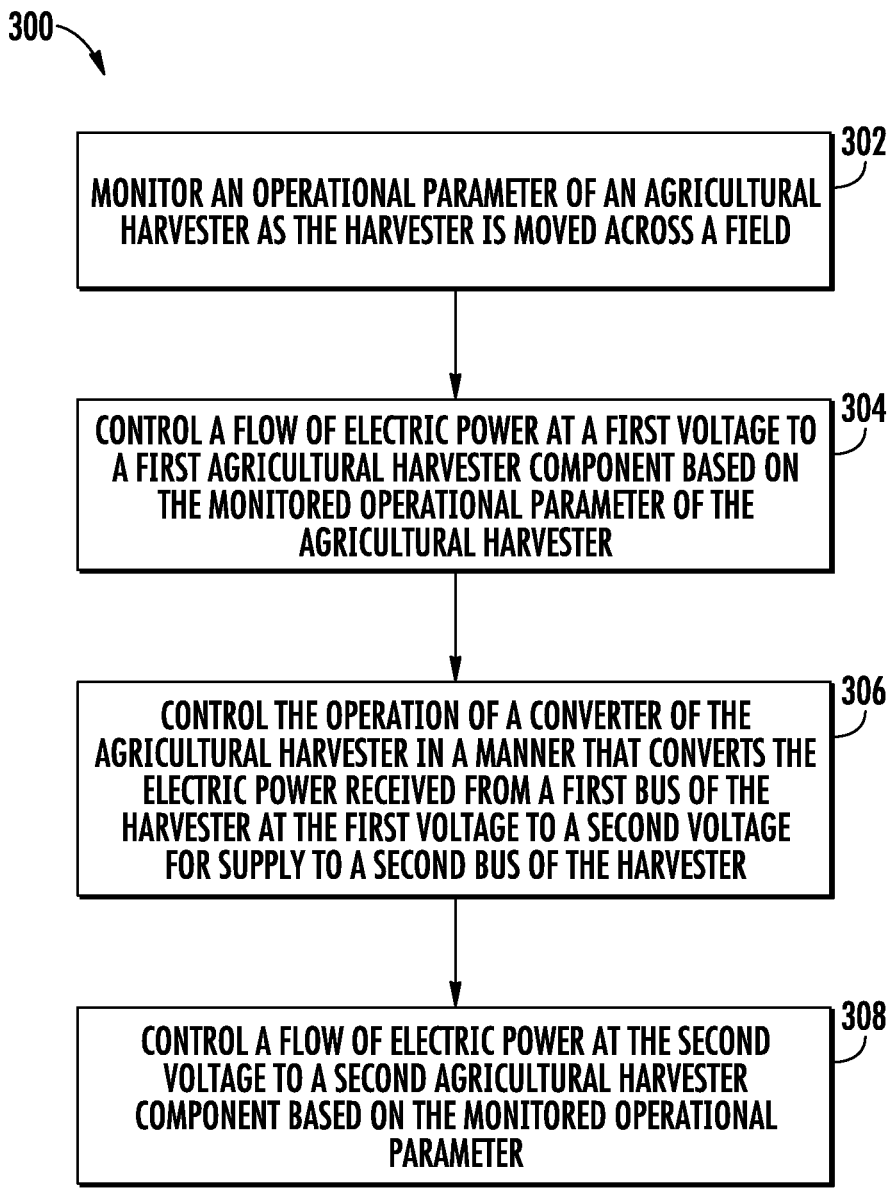
FIG. 4 illustrates a flow diagram of one embodiment of a method for operating an agricultural harvester in accordance with aspects of the present subject matter.

Referring now to FIG. 4, a flow diagram of one embodiment of a method 300 for operating an agricultural harvester is illustrated in accordance with aspects of the present subject matter. In general, the method 300 will be described herein with reference to the harvester 10 and the system 200 described above with reference to FIGS. 1-3. However, it should be appreciated by those of ordinary skill in the art that the disclosed method 300 may generally be implemented with any harvester having any suitable harvester configuration and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include monitoring, with a computing device, an operational parameter of an agricultural harvester as the harvester is moved across a field. For instance, as described above, the controller 226 may be communicatively coupled to one or more sensors 124 provided in operative association with one or more components of the harvester 10, such as one or more components of the powertrain 100. As such, when the harvester 10 is traversed across the field 20, the controller 226 may be configured to receive sensor data 232 from the sensor(s) 124.

Additionally, at (304), the method 300 may include controlling, with the computing device, a flow of electric power at a first voltage to a first agricultural harvester component based on the monitored operational parameter of the agricultural harvester. For instance, as described above, the controller 226 may be communicatively coupled to the electric motor(s) 202 of the high voltage component(s) of the harvester 10. As such, the controller 226 may be configured to transmit control signals 234 to the electric motor(s) 202 instructing suitable component(s) of the electric motor(s) 202 to control the flow of the electric power from the high voltage bus 214 to the electric motor(s) 202 based on the monitored operational parameter(s).

Moreover, as shown in FIG. 4, at (306), the method 300 may include controlling, with the computing device, the operation of a converter of the agricultural harvester in a manner that converts the electric power received from a first bus of the harvester at the first voltage to a second voltage for supply to a second bus of the harvester. For instance, as described above, the controller 226 may be communicatively coupled to the converter 224. As such, the controller 226 may be configured to transmit control signals 234 to the converter 224 instructing the converter 224 to operate in a manner that converts the electric power received from a high voltage bus 214 at the high voltage to the low voltage for supply to the low voltage bus 220.

Furthermore, at (308), the method 300 may include controlling, with the computing device, a flow of electric power at the second voltage to the second agricultural harvester component based on the monitored operational parameter. For instance, as described above, the controller 226 may be communicatively coupled to the electric motor(s) 206 of the low voltage component(s) of the harvester 10. As such, the controller 226 may be configured to transmit control signals 234 to the electric motor(s) 206 instructing suitable component(s) of the electric motor(s) 206 to control the flow of the electric power from the low voltage bus 220 to the electric motor(s) 206 based on the monitored operational parameter(s).

It is to be understood that the steps of the method 300 are performed by the controller 226 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 226 described herein, such as the method 300, is implemented in software code or instructions which are tangibly stored on a tangible computer readable medium. The controller 226 loads the software code or instructions via a direct interface with the computer readable medium or via a wired and/or wireless network. Upon loading and executing such software code or instructions by the controller 226, the controller 226 may perform any of the functionality of the controller 226 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for supplying electric power to components of an agricultural harvester, the system comprising:
   a power storage device;
   at least one of a base cutter assembly, a chopper assembly, a primary extractor, a fan, or an elevator drive;
   a first bus electrically coupled to the power storage device and the at least one of the base cutter assembly, the chopper assembly, the primary extractor, the fan, or the elevator drive such that the first bus supplies electric power from the power storage device at a first voltage to the at least one of the base cutter assembly, the chopper assembly, the primary extractor, the fan, or the elevator drive;

at least one of a crop divider, a topper assembly, a gatherer drum, or a secondary extractor;
a converter electrically coupled to the first bus; and
a second bus electrically coupled to the converter and the at least one of the crop divider, the topper assembly, the gatherer drum, or the secondary extractor such that the second bus supplies the electric power at a second voltage to the at least one of the crop divider, the topper assembly, the gatherer drum, or the secondary extractor, the second voltage being less than the first voltage,
wherein the converter reduces the first voltage of the electric power received from the first bus to the second voltage for delivery to the second bus such that the electric power from the power storage device is supplied to the at least one of the crop divider, the topper assembly, the gatherer drum, or the secondary extractor through the first bus, the converter, and the second bus.

2. The system of claim 1, wherein the converter is a buck converter.

3. The system of claim 1, further comprising:
a first DC-to-AC converter coupled between the first bus and the at least one of the base cutter assembly, the chopper assembly, the primary extractor, the fan, or the elevator drive; and
a second DC-to-AC converter coupled between the second bus and the at least one of the crop divider, the topper assembly, the gatherer drum, or the secondary extractor.

4. The system of claim 1, further comprising:
an electric motor electrically coupled to the first bus; and
a hydraulic pump configured to be driven by the electric motor, the hydraulic pump further configured to power one or more hydraulically-driven agricultural harvester components.

5. The system of claim 4, wherein the one or more hydraulically-driven agricultural harvester components comprise at least one of a crop roller, a slew drive, or a power steering system.

6. The system of claim 1, further comprising:
a sensor configured to detect an operational parameter of the agricultural harvester; and
a controller communicatively coupled to the sensor, the controller configured to monitor the operational parameter based on data received from the sensor, the controller further configured to control a flow of the electric power at the first voltage to the at least one of the base cutter assembly, the chopper assembly, the primary extractor, the fan, or the elevator drive and a flow of the electric power at the second voltage to the at least one of the crop divider, the topper assembly, the gatherer drum, or the secondary extractor based on the monitored operational parameter.

7. The system of claim 1, further comprising:
an internal combustion engine; and
a generator configured to be driven by the internal combustion engine, the generator further configured to supply the electric power to the power storage device.

8. The system of claim 7, further comprising:
an AC-to-DC converter coupled between the generator and the power storage device.

9. The system of claim 1, wherein the power storage device comprises one or more batteries.

10. The system of claim 1, wherein the first voltage is at least five times greater than the second voltage.

11. An agricultural harvester, comprising:
an internal combustion engine;
a generator configured to be driven by the internal combustion engine so as to generate electric power;
a power storage device configured to store the generated electric power;
at least one of a base cutter assembly, a chopper assembly, a primary extractor, a fan, or an elevator;
a first power supply system comprising a first bus electrically coupled to the power storage device and the at least one of the base cutter assembly, the chopper assembly, the primary extractor, the fan, or the elevator drive such that the first bus supplies electric power from the power storage device at a first voltage to the at least one of the base cutter assembly, the chopper assembly, the primary extractor, the fan, or the elevator drive;
a at least one of a crop divider, a topper assembly, a gatherer drum, or a secondary extractor; and
a second power supply system comprising a converter electrically coupled to the first bus and a second bus electrically coupled to the converter and the at least one of the crop divider, the topper assembly, the gatherer drum, or the secondary extractor such that the second bus supplies the electric power at a second voltage to the at least one of the crop divider, the topper assembly, the gatherer drum, or the secondary extractor, the second voltage being less than the first voltage,
wherein the converter reduces the first voltage of the electric power received from the first bus to the second voltage for delivery to the second bus such that the electric power from the power storage device is supplied to the at least one of the crop divider, the topper assembly, the gatherer drum, or the secondary extractor through the first bus, the converter, and the second bus.

12. The agricultural harvester of claim 11, wherein the converter is a buck converter.

13. The agricultural harvester of claim 11, further comprising:
an electric motor electrically coupled to the first bus; and
a hydraulic pump configured to be driven by the electric motor, the hydraulic pump further configured to power one or more hydraulically-driven components.

14. The agricultural harvester of claim 13, wherein the one or more hydraulically-driven components comprise at least one of a crop roller, a slew drive, or a power steering system.

15. The agricultural harvester of claim 11, further comprising:
a sensor configured to detect an operational parameter of the agricultural harvester; and
a controller communicatively coupled to the sensor, the controller configured to monitor the operational parameter based on data received from the sensor, the controller further configured to control a flow of the electric power at the first voltage to the at least one of the base cutter assembly, the chopper assembly, the primary extractor, the fan, or the elevator and a flow of the electric power at the second voltage to the at least one of the crop divider, the topper assembly, the gatherer drum, or the secondary extractor based on the monitored operational parameter.

* * * * *